May 31, 1932. W. C. FURNAS 1,861,428
HYDRAULIC CLEANING PLANT
Filed Aug. 16, 1926  6 Sheets-Sheet 1

Inventor
W. C. Furnas
by
Attorney

May 31, 1932. W. C. FURNAS 1,861,428
HYDRAULIC CLEANING PLANT
Filed Aug. 16, 1926  6 Sheets-Sheet 2

Inventor
W. C. Furnas
by G. P. Dillin
Attorney

May 31, 1932. W. C. FURNAS 1,861,428
HYDRAULIC CLEANING PLANT
Filed Aug. 16, 1926   6 Sheets-Sheet 3

May 31, 1932.  W. C. FURNAS  1,861,428
HYDRAULIC CLEANING PLANT
Filed Aug. 16, 1926    6 Sheets-Sheet 4

Inventor
W. C. Furnas
by G. P. Dilkin
Attorney

Fig. 18

Patented May 31, 1932

1,861,428

UNITED STATES PATENT OFFICE

WILLIAM C. FURNAS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

HYDRAULIC CLEANING PLANT

Application filed August 16, 1926. Serial No. 129,309.

This invention relates to hydraulic cleaning plants for castings.

The object of the invention, generally stated, is to improve and perfect a system or apparatus for washing castings, or the cores from castings, by means of a hydraulic jet.

Among the more specific objects of this invention may be mentioned the provision of:

Air circulation means for a housing in which the casting is washed.

A craneway combined with a housing having an opening in the wall across the crane travel.

Crank and motor operated end doors for the housing opening.

Flaps on the end doors.

A sectional slidable top for the housing, and an electrical control means for starting the sections in motion and for stopping same by dynamic braking.

The arrangement of artificial and natural lighting for the housing associated with the sectional top.

Improved baffles in the water return pit.

The provision of additional turntable tops; pins or stakes set in the turntable top; a mechanical central stop for the table to prevent rupture; dynamic braking applied to the electric power means for driving the table.

The provision of means for applying a jet from different levels, and control means at those levels.

Means for shifting a nozzle to different levels, and means for horizontally and vertically swinging the nozzle.

Means for applying a jet at approximately 1⅛" diameter at a pressure of approximately 400 pounds to accomplish the washing.

A nozzle mounted on a car and a flexible hose connection thereto.

The broad idea of removing core sand from castings by using a stream of water is not a new one. It has been tried at various times during the past few years with varying results. Water has been used in several ways, namely:

(1) By soaking to soften the cores.
(2) By washing out, using a hose and low pressure water, say up to 100 pounds per square inch.
(3) By using a fixed nozzle and high pressure water, say up to 500 pounds.
(4) By using a fixed nozzle and very high pressure water, say up to 2000 pounds.

In some cases the soaking process makes the cores easier to remove, but in most cases it is ineffective. The reason for this is that the sand is held together by a carbonized organic compound, and there is nothing which will dissolve this binder.

Core sand has been loosened up by hand and then washed out by low pressure. This has the advantage of eliminating the dust, which otherwise is raised when the loose sand is blown out by air, but it is very difficult to lossen up some cores by hand.

The higher pressure processes of washing used a fixed nozzle and thus caused great inconvenience in not being able quickly to reach desired points of the core that were best adapted to being washed out at particular instants.

At times it was almost impossible to find men who would clean castings under old conditions. Labor turnover was always high and consequently a cause of unnecessary expense. These conditions, of course, it is understood are involved in the hand cleaning out of the cores of the castings and removal of the loose sand by means of an air blast. With the present improvements it is possible to make the foundry a much more desirable place to work in than when doing such hand cleaning. The labor cost is greatly reduced. It is possible to save quite an item of expense by being able to use the core rods and arbors over again as they are not damaged in cleaning by the use of this invention. These savings might be considered small items as compared with the ability to get the work done at all during a busy season and getting it done quickly. Much time is saved as it requires only a fraction of the time to clean by the use of this invention as compared to the hand process. As much as two weeks is saved in certain cases.

In the drawings forming part of the specification of this invention like reference characters are used in the various views, to represent the same or similar parts.

The location of a hydraulic cleaning plant of this kind may be anywhere near the foundry or within a reasonable distance therefrom, but it is desirable to locate same in the clean-up end of the foundry itself; that is, at the end of the foundry where hitherto it was usual to transport the castings to be cleaned for removal of the core together with the rods, arbors, etc. The plant being located within the foundry itself, it then becomes desirable because of the hydraulic nature of the process, to house the working jets so as not to permit them to play within the foundry on other operations there proceeding.

Figure 1:
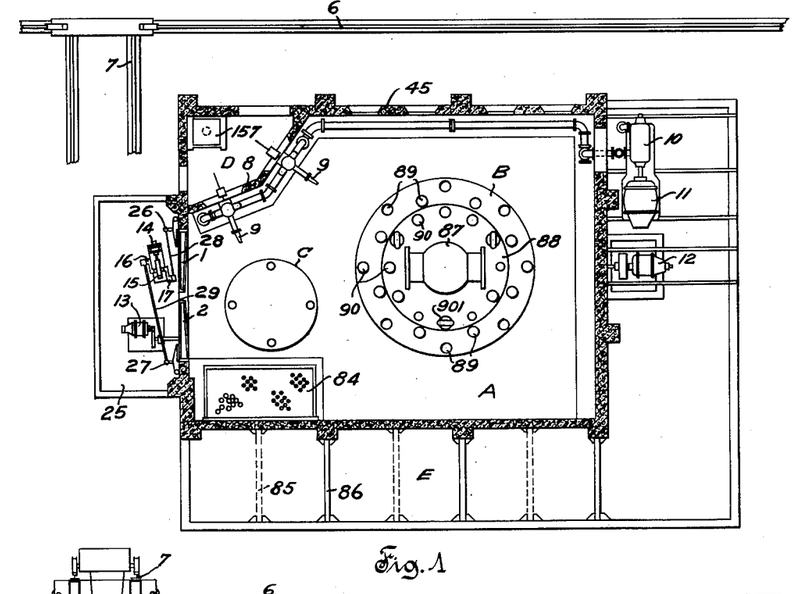
Fig. 1 is a sectional plan view of a cleaning plant showing two turntables, and their driving motors, a motor driven pump, and a pipe line to the nozzles, a nozzle tower, a hydraulic elevator, and end door operating mechanism and settling pits with baffles therein.
Figures 2, 20:
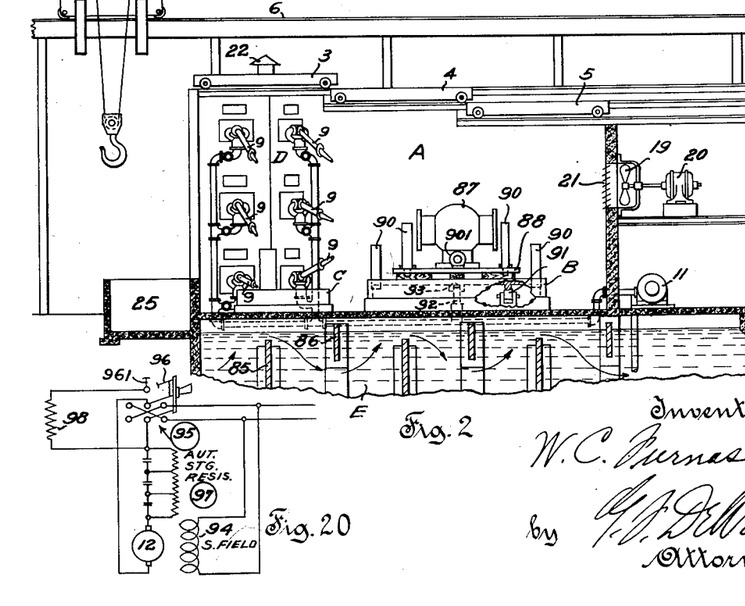
Fig. 2 is a longitudinal vertical section of the cleaning plant of Fig. 1, illustrating the settling pit and baffles, the nozzles, a turntable, a motor driven fan and ventilating chimney, the pump, slidable top doors in closed position, and a craneway.
Fig. 20 is a wiring diagram for the operating means for one of the turntables.

*Housing and general.*—A housing A, Figs. 1 and 2, comprises a walled chamber having end doors 1, 2 and a slidable top in three sections 3, 4, 5. This housing A is located as already stated at the clean-up end of the foundry which is equipped with a craneway 6 supporting a crane 7. Within the housing are located large turntable B driven by electric motor 12 and small turntable C driven by electric motor 13. In one corner of the housing A is partitioned off a three-storied triangular nozzle station D. Just within the partition 8 are positioned six nozzles 9, two to each story, one at each story being ordinarily directable toward a corresponding turntable B, C. These nozzles are supplied by a pump 10 driven by an electric motor 11. The end doors 1, 2 at the end of the housing A are driven by electric motor 14 by means of a reduction gearing 15 and cranks 16, 17. A settling pit E is located outside the housing A adjacent two walls thereof beginning at the wall having the end doors 1, 2 and terminating underneath the pump 10. The top sections 3, 4, 5 are operated by independent electric motors 18, see Fig. 6.

*Housing, ventilation.*—There is so much spray and steam produced during the cleaning operation that it is desirable to have some ventilation means for the housing A. This is accomplished as illustrated particularly in Fig. 2 by a fan 19 driven by electric motor 20, the fan being located outside the wall of the housing and adjacent the louvre 21 in the wall. An outlet for the air is provided by a chimney 22, or if desired, by screens 23, 24, see Fig. 4, which also serve the purpose of natural lighting to be later described.

*Housing, end doors and slidable top.*—It will be observed that the housing has its entire top slidable in the direction of the foundry craneway 6 so as to open the entire top of the housing A. It will also be observed that the swinging end doors 1, 2 are provided in a wall of the housing A transverse to the travel of the crane. It thus is arranged that the foundry crane may pick up any casting in the foundry that needs cleaning and transport same directly into the housing on to the turntables, there being no interference with the crane cables.

Figures 3, 19:
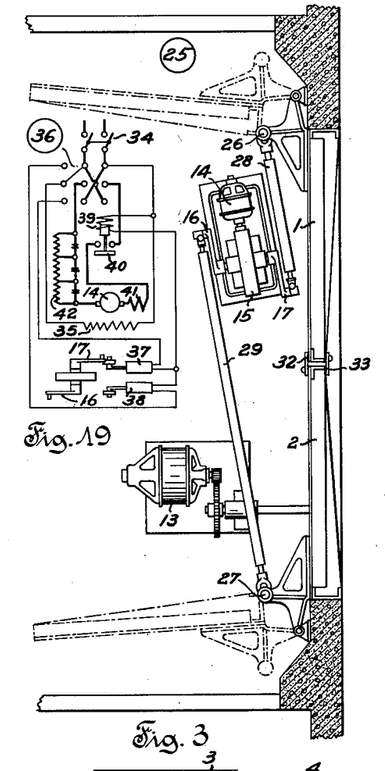
Fig. 3 is an enlarged detailed plan view of the end doors in closed position, the open position being shown in dotted line.
Fig. 19 is a wiring diagram for the operating means for the swinging end doors.

*Housing, end doors, operating means.*—The end doors and their operating mechanism are shown in Figs. 1 and 3. A pit 25 for the operating means is shown in Figs. 1 and 2, the operating means and end doors being omitted from Fig. 2 for the sake of clearness. The doors have vertical bars 26, 27 mounted on the part of the hinge fastened to the doors and extend down into the pit 25. These bars 26, 27 may pass through slots in a cover, not shown, provided for the pit if necessary. From the lower ends of the vertical bars 26, 27 extend connecting rods 28, 29 to cranks 16, 17 mounted on a main shaft of an ordinary reduction gearing 15, the high speed shaft of which is driven by the electric motor 14. It will be observed that this driving mechanism is arranged so that the axis of the cranks is at an angle to the side of the housing which is transverse to the travel of the crane, having a value differing slightly from 90°. This also brings the connecting rods at a slight angle to the end wall of the housing A. The effect of this is to make the extension of the short connecting rod 28 distant from the axis of the adjacent hinge an amount greater than the distance between the extension of the long connecting rod 29 from the axis of its adjacent hinge. For a given amount of crank swing, therefore, a greater swing will be produced on door 2 as compared with the swing of door 1. Door 2 will therefore open first and close last. A rubber flap 32 is therefore mounted on the outside of door 2 and another rubber flap 33 is mounted on the inside of door 1.

*Housing, end doors, operating means, wiring diagram.*—The wiring diagram for the end doors is shown in Fig. 19. A main switch 34 admits current directly to shunt field 35 of motor 14. A three-pole double-throw switch 36 provides for the starting of the motor in either direction. Limit switches 37, 38 are provided to be contacted by cranks 16, 17 respectively. The pole on the left side of the switch controls the circuits through the limit switches 37, 38. The upper terminal controlling switch 38 and the lower terminal controlling switch 37, both of these limit switch circuits actuate a solenoid 39 which closes gravity-biassed switch 40 in the armature circuit of motor 14. This armature circuit includes also the series field 41 and starting resistance 42. It will be seen from this disclosure that from a position of the end doors closed by say a direct rotation of motor 14 the latter can be reversed in order to again open the doors. At the end of the travel 180°, one of the cranks will trip a limit switch open which had just served as a means for actuation of the solenoid 39, and consequently switch 40 will be released and the motor stopped.

Figure 4:
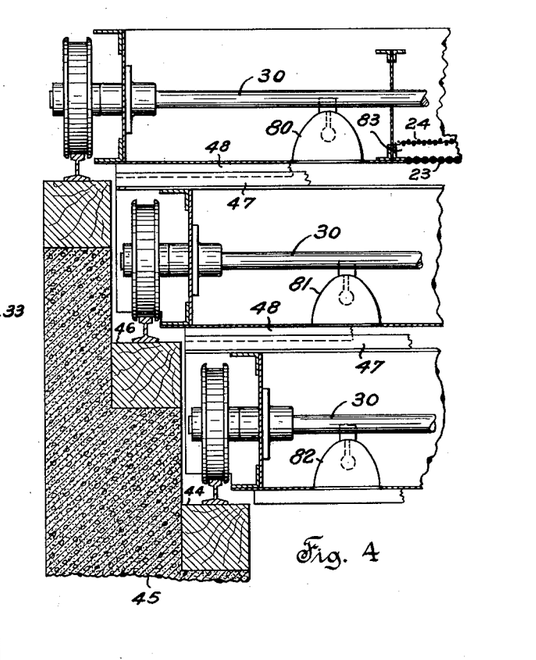
Fig. 4 is a fragmentary view of the sectional top doors and the artificial lighting, together with the natural lighting applied to one of the sections.
Figure 5:
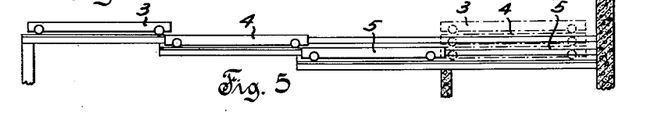
Fig. 5 is a diagram of the top doors in closed position in full lines and in open position in dotted lines.
Figure 6:
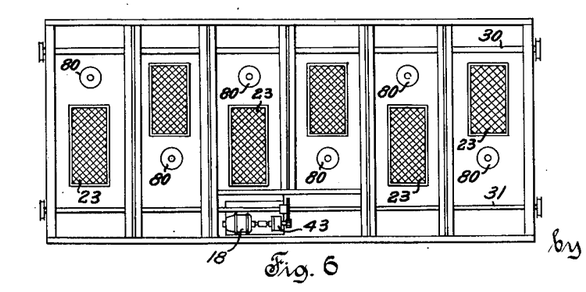
Fig. 6 is a plan view of one section of the top doors indicating the motor drive and the artificial lighting.

*Housing, sectional top.*—It has already been pointed out that the top of the housing, see Figs. 2 and 5, is formed in three sections 3, 4, 5. A top view of one of these sections is shown in Fig. 6 and a fragmentary view of all three of the sections showing the means for supporting same from the side walls of the housing A is shown in Fig. 4. Each of these sections is provided with two shafts 30, 31 carrying groove wheels at their ends, one of these shafts 31 being driven by a motor 18 through suitable reduction gearing 43. The lower of these sections 5, is the shortest in order that the wheels may run on a rail mounted on the innermost ledge 44 of the wall 45, see Fig. 4. The middle section 4 is somewhat longer and runs on rails on a mid ledge 46 of the wall 45. The top section is the longest and runs on rails mounted adjacent the top outer edge of the wall 46. Cleats 47, 48 are attached to the adjacent edges of the top sections when the top is closed, in order to keep the water from passing out between the sections.

Figure 18:
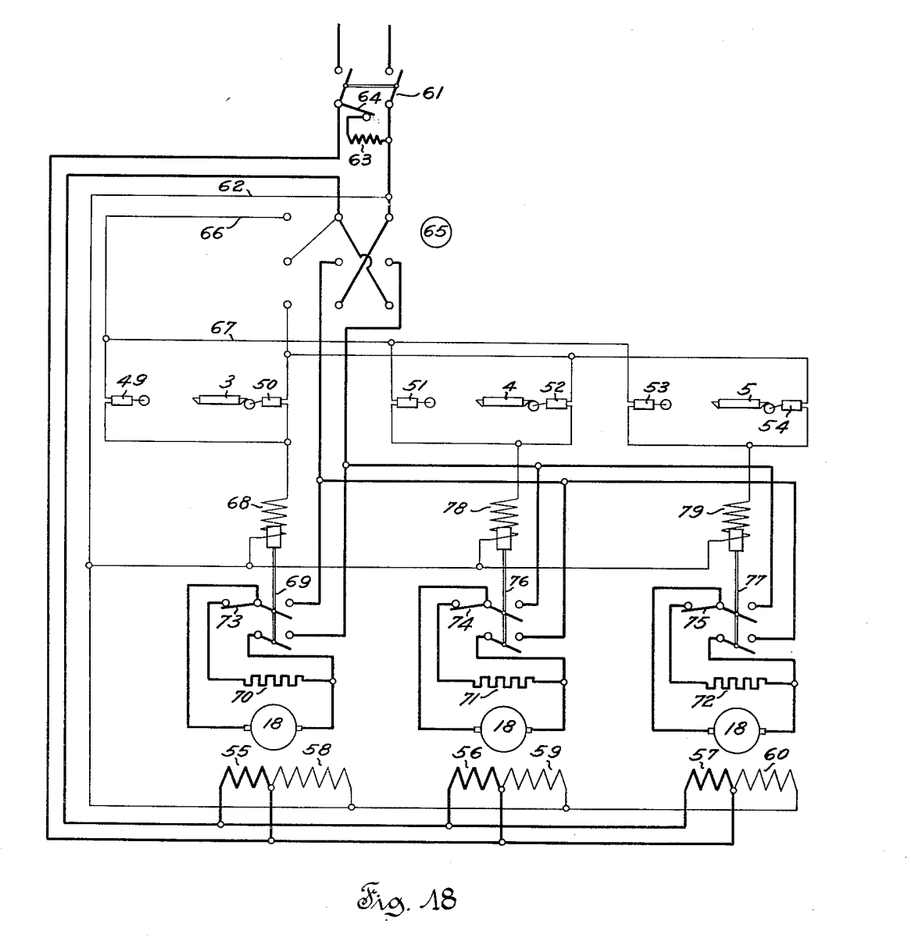
Fig. 18 is a wiring diagram for the operating means for the three-section top of the housing.

*Housing, sectional top, motor drive, electric control.*—The opening and closing of the sectional top of the housing A is controlled by the operator in the nozzle station D. As already pointed out, each of the sections is motor driven as shown in Fig. 6 and it is desirable in either opening or closing the top of the housing, to start all the sections of the top in motion at the same instant. It is also desirable that they stop when they arrive at the proper position without overrunning. These desirable features are accomplished by a system of wiring the motor drive so that the starting of all the motors is accomplished from a single switch and the stopping is accomplished by limit switches combined with dynamic braking of the motors. This wiring diagram is shown in Fig. 18. The top sections 3, 4, 5 are diagrammatically shown in position so as to contact with limit switches 49, 50, 51, 52, 53, 54. The motors 18 are compound. The series fields 55, 56, 57 are shown adjacent the shunt fields 58, 59, 60. When the main switch 61 is closed the shunt fields 58, 59, 60 are at once thrown in across the line by the return wire 62. When the main switch 61 is opened the shunt fields are thrown in circuit with a resistance 63 by means of an auxiliary switch blade 64 as part of the switch 61, in order to neutralize the inductive effect of the shunt coils. A three-pole double-throw switch 65 serves to start the top sections 3, 4, 5 in motion by first establishing a control circuit through the closed limit switches, say 49, 51, 53. This control circuit provides for a flow first through the series fields 55, 56, 57 through the first pole of the switch 65, thence through line 66 through the limit switch 49 (and through line 67 to limit switches 51, 53 which latter circuits will not be here followed) thence through solenoid 68 actuating gravity-biassed switch 69 and from the solenoid 68 back through return wire 62 to the other side of the line. This control circuit will, by the closing of switch 69, effect the main circuit through the armature of the motor 18 through the other two poles and blades of the switch 65. The motors 18 will then rotate to drive the top sections 3, 4, 5 to the left until they respectively strike the limit switches 49, 51, 53 with which they coact. When limit switch 49 is thus opened the control circuit through solenoid 68 will be broken and switch 69 will drop by gravity, opening the circuit through the armature 18 and establishing a dynamic braking circuit through a resistance 70 by means of a tail blade 73 on the switch 69. The armature being placed directly in circuit with the resistance 70 will come to a quick stop and similarly stop the top section driven thereby. In the same way the other top sections will be quickly stopped at the end of their travel by dynamic braking through resistances 71, 72 placed in circuit by tail blades 74, 75 of gravity-biassed switches 76, 77 actuated by solenoids 78, 79. The actuation of the top sections 3, 4, 5 in the opposite direction is similarly accomplished by throwing the main double-throw switch 65 to its other position.

*Housing, lighting.*—The lighting of the housing is accomplished by electric lamps placed at any suitable location within the housing, preferably adjacent the nozzles 9. Further effective lighting may be accomplished by placing electric lamps 80, 81, 82 in the top sections 3, 4, 5 as shown more particularly in Figs. 4 and 6. These lamps are preferably placed within reflectors having their front edge lying in the lower plane of the top sections and suitably protected by wire glass extending across the front of the reflectors. Natural lighting may be provided for by forming openings 83 in the top sections 3, 4, 5 and covering these openings by means of a lower course screen 23 and an upper fine screen 24. For the sake of clearness the fine screens are omitted from Fig. 6. It will be seen that light, either natural or artificial, from the foundry building will penetrate through the screens 24, 23 and reach the interior of the housing A. Violent splashing of water from within the housing out into the foundry will be prevented by these screens 23, 24 which will also permit any water getting through to return back to the housing chamber.

*Water, return circulation.*—The spent water, after it has been used to wash a casting together with much coarse sand, drains into a pit in one corner of the housing A. This pit is covered by a screen 84, see Fig. 1, preventing rods, arbors and gaggers from getting into the pit. From this pit water passes through the wall of the housing A into the settling pit E running alongside the housing walls back to a point underneath the pump 10. Practically all of the sand carried by this water is deposited in the settling pit E because of the arrangement of baffles 85, 86. The baffles 85 extend up from the bottom of the pit E to a point about a foot below the surface of the water in the pit. The baffles 86 extend from above the surface of the water in the pit to a point about three feet below the surface. These two kinds of baffles alternate in position. There is thus provided a swift current of small cross-section over the top of baffles 85 directed downwardly. Any sand carried by this swift current will be carried on down to the bottom of that section of the pit. The current then becomes slow as it passes underneath baffles 86 so as not to disturb any sand which is being deposited into the sections of the pit. In this manner all of the sand is deposited before water has flowed very far in the pit E. The water is, of course, used over again in the nozzle and pump 10.

*Water, pressure, velocity.*—While there may be special cases it has been discovered in the practice of this invention that remarkable results are secured with a pressure of 510 pounds working through a nozzle forming a 1⅛″ diameter jet. With a jet of this size if the pressure is increased it becomes expensive to operate the pump and if it is decreased the jet is inefficient to perform the proper washing. On the other hand if the pressure is held at approximately 500 pounds per square inch and the jet is made smaller than inch and one-eighth there is not enough volume of water to flush out the cut cores; whereas if the jet is larger there is again too much expense to operate the pump. There is therefore a peculiar combination of this pressure of practically 500 pounds and a jet of 1⅛″ diameter which is most effective in general to perform efficient washing of casting. Of course, it would take much more time to wash a casting with a small jet at a suitable high pressure.

*Water, pump, operating means.*—The pump 10 is driven by electric motor 11 which is started by applying electric energy thereto in any suitable manner, generally by a push button from the power supplying using a suitable contactor starter. A shut-off valve could be used to stop the water supply, such a valve being preferably electrically operated, but it has been found more suitable to start and stop the pump, as this could be done quicker than by using shut-off valves.

*Débris handling, rods, arbors, gaggers.*— It has been found most suitable to use an ordinary lifting magnet operated from the main foundry crane to pick up all the different pieces of iron removed from the casting and washed out on the floor of housing A.

*Débris handling, sand and gravel.*—Whatever sand gathers on the floor of housing A can be gathered together and removed by the main crane operating a grab bucket. This same method may be used to remove sand and gravel from the settling pit E.

*Casting handling, turntable.*—Castings 87 are brought into the housing A by the foundry crane 7 and deposited on the turntables B, C. The large turntable B is shown as in Figs. 1 and 2 as being provided with an extra top 88 of which there may be several others for the purpose of being loaded or transported by crane from eye-bolts 901 while castings on one of them are being washed. The turntables B, C, as also the extra tops 88, are provided with holes 89 near the periphery and also at any desired points of the surface for the insertion therein of pins or stakes 90 to prevent the casting 87 from being washed off the table. These pins or stakes 90 are also convenient to form a sort of basket out of the extra top 88 so as to load the same with a miscellaneous collection of smaller castings for the purpose of cleaning same.

The turntables B, C are mounted on a series of rollers 91 carried on radial shafts and are centered by a central pin 92 taking in a socket 93 underneath the table. The bottom of the socket is spaced from the top of the center pin 92 a distance which is less than the maximum deflection that might otherwise occur on loading the table with a large casting and which deflection might cause the material of the table to go beyond its elastic limit. This arrangement is especially valuable at times of loading when such an extreme stress might be produced.

*Casting handling, turntable, electric drive, dynamic braking.*—The turntable B is driven by electric motor 12 by means of suitable reduction gearing and the table C is driven by electric motor 13 by similar reduction gearing. The control of these electric motors 12, 13 is effected from the nozzle station D and the wiring diagram for such control is shown in Fig. 20. The main switch is not shown in this figure and the shunt field 94 of the motor 12 is shown connected directly across the line. A two-pole double-throw reversing switch 95 has an additional blade 96 electrically connected to the adjacent blade of switch 95 for the purpose of dynamic braking. Automatic starting resistance 97 is shown in the armature circuit of the motor 12 which can be reversed by throwing the switch in the opposite closed position. A dynamic braking resistance 98 is arranged for connection in the armature circuit of the motor 12 at a time when the switch 95 is near mid position. It will therefore be clear that when the switch 95 is thrown to mid position from either active position, with blade 96 on contact 961, the armature will be thrown directly in circuit with the dynamic braking resistance 98 thereby quickly stopping the rotation of the table and if the switch is thrown to its opposite position the table will be quickly reversed. This is an important feature of the present invention in order to give the operator such control over the angular adjustment of the presentation of the casting to the jet, as to quickly play the jet on the casting interior with the casting presented at one angle and immediately thereafter at another angle which enables easy dislodgement of parts of the core.

Figure 7:
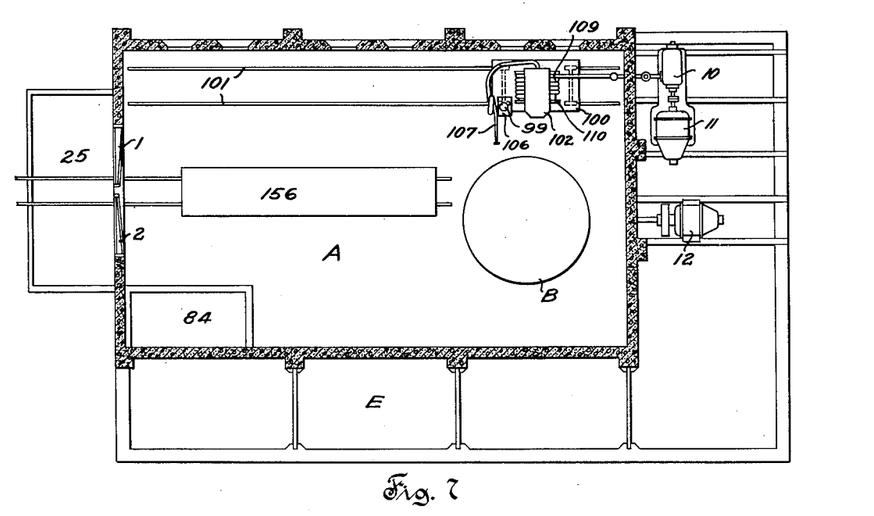
Fig. 7 is a sectional plan view of a modification wherein a portable carriage bears a column on which is mounted a universal nozzle electrically controlled from an enclosed station located on the carriage, the water supply to the nozzle comprising a flexible hose which winds and unwinds on a drum as the carriage is moved in one or the other direction, and the casting support comprising a track to enable a flat car to enter the housing. A turntable is also shown.
Figure 8:
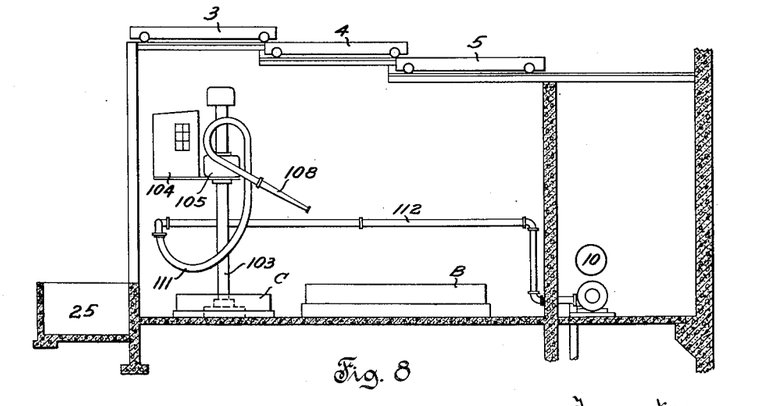
Fig. 8 is a vertical sectional view of another modification in which a stationary column carries an electrically operated universal nozzle and operating station, both vertically adjustable on the column.

*Nozzles.*—It is an important part of this invention that the universal nozzles employed and their arrangement be such that the jet formed thereby may be directed on the casting from different levels. In Figs. 1 and 2 this is done by having three sets of nozzles 9 at three different levels, while in Figs. 7 and 8 one nozzle is arranged to be vertically translated on a column so as to apply the jet from different levels. In Fig. 7 the nozzle 107 is carried by a nozzle block 106 on a column 99 mounted on a car 100 running on rails 101 in the housing A. The control station 102 is also mounted on the car 100. In Fig. 8 the column 103 is stationarily mounted and a control station 104 is carried by the nozzle block 105 carrying nozzle 108. In Fig. 7 the nozzle 107 is connected to the pump 10 by a flexible hose 109 carried by a reel 110 on the car. In Fig. 8 the nozzle 108 is connected by flexible hose 111 and a pipe line 112 to the pump 10.

*Vertically movable nozzle.*—The mechanism for the vertically movable nozzle of Figs. 7 and 8 is more particularly shown in Figs. 9 to 14 inclusive. The column is hollow and the nozzle block 106 is supported thereon by means of chains 113, 114 running on chain wheels 115, 116 carried at the upper end of the column 99, the chains extending down within the column where they terminate by suspending a counter-weight 117. The chain 114 is shown as carrying stops 118, 119 which may respectively contact with swingable elements 120, 121 of limit switches 122, 158 mounted on the top of the column. These limit switches 122, 158 are part of the control circuit of motor 123 which, through a suitable chain 139 and reduction gearing 124 also mounted at the top of the column, drives the shafts of chain wheels 115, 116. This electric control is substantially the same as the electric control for the top sections, 3, 4, 5.

*Vertically swingable nozzle.*—Both the nozzles 107, 108, of Figs. 7 and 8, are vertically swingable but only one of these will be described as the mechanism is the same. This feature is more particularly shown in Figs. 15, 16 and 17. The nozzle 107 is carried by an arc shaped casting 125 which is carried by shaft 126 serving as a pivotal mounting on the nozzle block 106. The arc shaped casting 125 also carries a grooved support and guide 127 for the hose 109. The arc shaped casting 125 is formed with a segmental gear 128 which meshes with a pinion 129 carried by shaft 130 which, by reduction gear 131, worm wheel 132 and worm 133, is driven by a motor 134 carried within the housing of nozzle block 106.

Figures 9, 12, 13, 14:
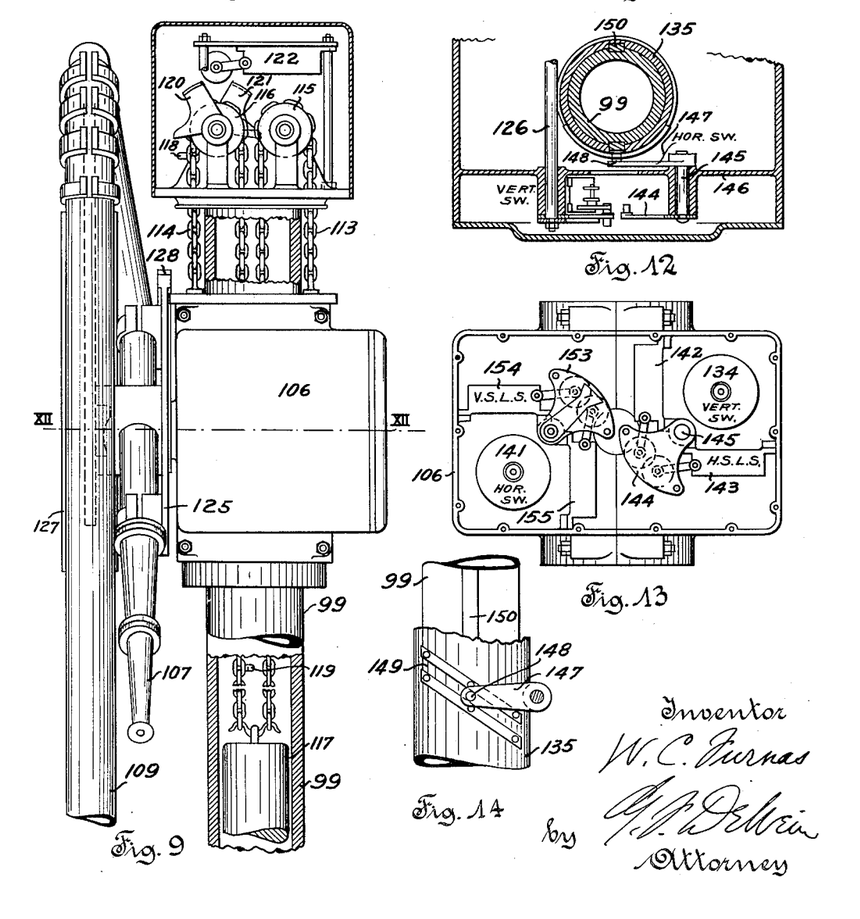
Fig. 9 is an enlarged detailed view of the upper end of the column of either Fig. 7 or 8, carrying the mechanism for the universal motion of the nozzle, and showing the enclosed limit switch at the extreme top of the column to limit the vertical motion of the nozzle in either direction.
Fig. 12 is an enlarged horizontal section on line 12—12 of Fig. 9 indicating on the right and left respectively the operating levers for limit switches for horizontal and vertical swinging of the nozzle.
Fig. 13 is an enlarged side elevation of the structure shown in Fig. 9 with the plate removed showing the nozzle block, the limit switches and the motors for swinging the nozzle.
Fig. 14 is an enlarged vertical detailed view showing the groove on the sleeve on the column for actuating the lever for the limit switch for the horizontal swinging of the nozzle.
Figure 10:
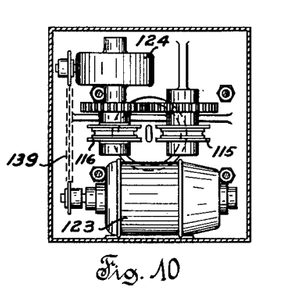
Fig. 10 is a sectional plan view and Fig. 11 a sectional elevation of a mechanism for raising and lowering the nozzle, together with the station if used as in Fig. 8.
Figure 11:
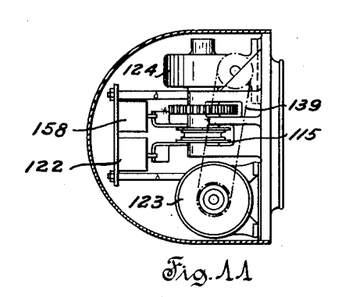
Figures 15, 16, 17:
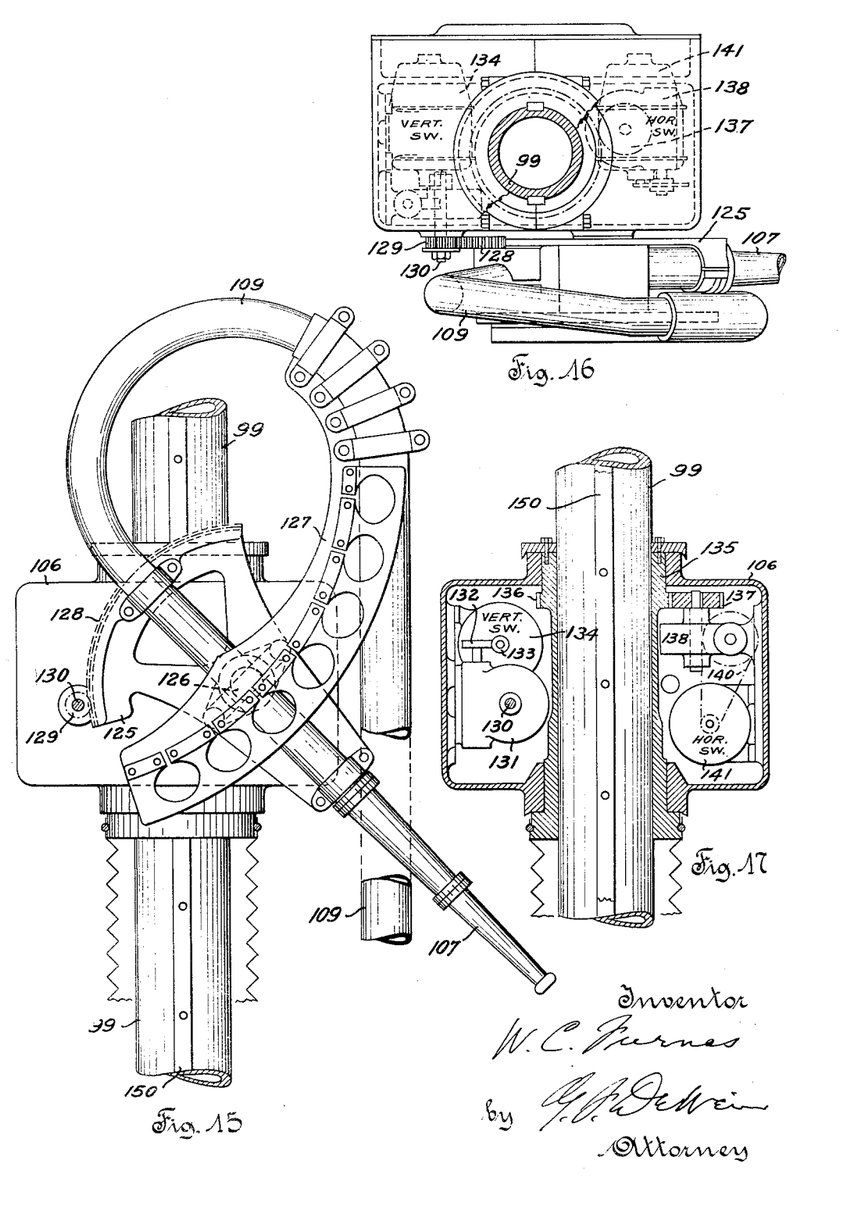
Fig. 15 is an enlarged side elevation of the nozzle, the gear segment for operating the same, the nozzle block and column.
Fig. 16 is an enlarged plan view of the same.
Fig. 17 is an enlarged vertical sectional view through the nozzle block showing the motor drives for vertical and horizontal swinging of the nozzle.

Limit switches 154, 155, see Fig. 13, are carried within the housing of nozzle block 106 and may be actuated by a member 153 carried by the end of shaft 126 which forms the pivotal mounting of the nozzle as shown in Fig. 15. When the nozzle 107 is vertically swung by motor 134, see Fig. 16, shaft 126 will rotate actuating member 153 so that at the limiting position, that one of the limit switches 154, 155, being approached, will be tripped thereby and open the circuit of the driving motor 134. The nozzle 107 will therefore be stopped in its vertical swing and must then be reversed by the reversing switch, not shown, but which circuit is similar to that controlling the top sections, 3, 4, 5.

*Horizontally swingable nozzle.*—The nozzles 107, 108 are both horizontally swingable but the description will be made with reference to only one of these because the driving mechanism is similar. This is more particularly shown in Figs. 12 to 17 inclusive. The sleeve 135 is slidable on column 99 by a spline 150 and rotatably carries the nozzle block 106. The sleeve 135 is provided with a gear 136, see Fig. 17, meshing with a pinion 137 which through reduction gearing 138 and chain 140 is driven by motor 141 mounted within the housing of nozzle block 106. Limit switches 142, 143, see Fig. 13, are provided within the housing of nozzle block 106 and are part of the circuit arrangement for motor 141. The actuating member 144 for these limit switches 142, 143, is swingable on a horizontal shaft 145 carried by a partition 146 in the nozzle block 106. This shaft carries a crank arm 147 whose crank pin 148 traverses a groove 149 on the sleeve 135. When the motor 141 is actuated the rolling of pinion 137 on gear 136, will react to horizontally rotate nozzle block 106, and during this rotation the traverse of pin 148 in groove 149 will rotate shaft 145 and swing the actuator 144 so that at either limit position of such actuator the latter will trip that limit switch 142, 143 that it is approaching and thus stop the motor.

*Nozzle on car.*—The nozzle 107 is shown in Fig. 7 as mounted on a car as already stated, the purpose being to facilitate the washing of a long casting similar to an engine bed for instance. This long casting can be transported by a flat car 156 and in the washing process the nozzle can be translated horizontally by running the car 100 back and forth on rails 101.

*Station, plurality of floors.*—It has already been described that the jet may be applied from different levels either by having several floors for the station, or by translating the nozzle vertically. When a plurality of floors is used, the controls for the end doors, the sectional top, and the turntables, are run to each individual station in multiple so that the operator at any one of the stations may control the various mechanisms. Access to the several floors may be secured by hydraulic elevator 157 or by stairway, not shown.

*Operation.*—Most of the points of operation have already been discussed, but it may additionally here be stated that in order to prepare the housing A for a casting cleaning operation, the end doors, 1, 2, and top sections, 3, 4, 5 are simultaneously opened up by the control means, leaving the housing freely open so that the foundry crane 7 may place a casting 87 on the table B. After the crane 7 is withdrawn the operator simultaneously closes the end doors and top sections and the pump is then ready to be started and the jets applied by any selected nozzle 9. The table may be continually rotated back and forth in order to present the casting at the best angle for a jet reception. The sand of the core is all washed out and many of the core rods are projected out of the casting and the others are loose within and can be easily removed by hand. The core rods can finally be gathered up from the floor of the housing A by a lifting crane magnet and used over again. The sand may be removed from the floor of housing A whenever necessary and also from the settling pits when this becomes necessary.

It should be understood that it is not desired to limit the invention to the exact details of construction herein shown and described, for various modifications within the scope of the claims may occur to persons skilled in the art.

It is claimed and desired to secure by Letters Patent:

1. Apparatus for hydraulically cleaning castings, comprising, a carrier for movably supporting a casting, a movable nozzle for directing a jet of water against a casting supported by said carrier, a housing covering said carrier and the discharge orifice of said nozzle to confine the spray produced by said jet, and means for creating a flow of air through said housing in proximity to a casting resting upon said carrier.

2. Apparatus for hydraulically cleaning castings, comprising, a carrier for movably supporting a casting, said carrier comprising a top having a series of holes and removable pins disposed within said holes to retain the castings upon said carrier, and a movable nozzle for directing a jet of water against a casting retained upon said carried by said pins.

3. Apparatus for hydraulically cleaning castings, comprising, a carrier having a rotary top, a motor for rotating the top of said carrier in either direction about an axis, control means for said motor including devices for dynamic braking, and a universally dirigible nozzle for directing a jet of water against a casting supported by the top of said carrier.

4. Apparatus for hydraulically cleaning castings, comprising, a carrier for movably supporting a casting, a car freely movable on rails in proximity to said carrier, a nozzle supported by said car for directing a jet of water against a casting supported by said carrier and conduit means for supplying water from a stationary source to said nozzle.

5. Apparatus for hydraulically cleaning castings, comprising, a carrier for movably supporting a casting, a car freely movable on rails in proximity to said carrier, a nozzle supported by said car for directing a jet of water against a casting supported by said carrier, conduit means for supplying water from a stationary source to said nozzle, and a housing covering said carrier and said car to confine the spray produced by the jet delivered from said nozzle.

6. An apparatus for hydraulically cleaning castings, comprising a carrier for supporting a casting, means for subjecting said casting to a water cleaning, means remote from said carrier for controlling said means, and means for creating a flow of air in proximity to a casting supported by said carrier, to maintain visibility of said casting.

7. Apparatus for cleaning castings, comprising, a carrier for movably supporting a casting, a car transportable laterally of and in proximity to said carrier, a nozzle vertically adjustably associated with said car for directing a jet of water against a casting supported by said carrier, and means for supplying water from a stationary source to said nozzle.

8. Apparatus for cleaning castings, comprising, a turntable for movably supporting a casting, a car transportable in proximity to the periphery of said turntable, a universally dirigible nozzle vertically adjustably supported by said car for selectively directing a jet of water against any portion of a casting supported by said turntable, and conduit means for supplying water from a stationary source to said nozzle.

9. In a hydraulic cleaning plant, a vehicle for supporting a relatively long casting to be cleaned, a car movable lengthwise of said vehicle, a dirigible nozzle carried by said car, a stationary source of high pressure water supply for said nozzle, and means associated with said car and carrying a conduit connected to said water supply and to said nozzle, for permitting interrupted lengthwise movements of said car while cleaning said casting.

10. In a cleaning plant, a vehicle for supporting a relatively long casting to be cleaned, a car movable lengthwise of said vehicle, a vertically adjustable dirigible nozzle carried by said car, a stationary source of high pressure cleaning agent for said nozzle, and means associated with said car and carrying a conduit connected to said stationary cleaning agent source and to said nozzle, for permitting interrupted lengthwise movements of said car while cleaning said castings.

In testimony whereof, the signature of the inventor is affixed hereto.

W. C. FURNAS.